United States Patent
Huh et al.

(10) Patent No.: US 10,742,506 B2
(45) Date of Patent: Aug. 11, 2020

(54) POLICY-BASED STORAGE SERVICE FEDERATION METHOD AND APPARATUS

(71) Applicant: University-Industry Cooperation Group of Kyung-Hee University, Yongin-si, Gyeonggi-do (KR)

(72) Inventors: Eui Nam Huh, Yongin-si (KR); Rene Ivan Heinsen Heinsen, Santo Domingo (DO); Jun Hak Park, Seoul (KR); Yunkon Kim, Yongin-si (KR)

(73) Assignee: University-Industry Cooperation Group of Kyung-Hee University, Yongin-si (KR)

( * ) Notice: Subject to any disclaimer, the term of this patent is extended or adjusted under 35 U.S.C. 154(b) by 102 days.

(21) Appl. No.: 15/991,777

(22) Filed: May 29, 2018

(65) Prior Publication Data

US 2019/0372847 A1 Dec. 5, 2019

(51) Int. Cl.
G06F 15/173 (2006.01)
H04L 12/24 (2006.01)
H04L 29/08 (2006.01)
H04L 29/06 (2006.01)

(52) U.S. Cl.
CPC ...... *H04L 41/0893* (2013.01); *H04L 41/5009* (2013.01); *H04L 41/5054* (2013.01); *H04L 41/5096* (2013.01); *H04L 63/08* (2013.01); *H04L 67/1097* (2013.01)

(58) Field of Classification Search
CPC ............. H04L 41/0893; H04L 41/5009; H04L 41/5054; H04L 41/5096; H04L 63/08; H04L 67/1097

USPC ........................................................ 709/223
See application file for complete search history.

(56) References Cited

U.S. PATENT DOCUMENTS

2016/0127339 A1* 5/2016 Childs .................. G06F 16/148
                                                            726/7
2019/0245862 A1* 8/2019 Kruse ................... H04L 63/102

FOREIGN PATENT DOCUMENTS

KR    10-2012-0072241 A    7/2012
KR    10-2014-0054950 A    5/2014

OTHER PUBLICATIONS

Yunkon Kim et al., "A Study on Data Storage Federation Model for Increasing Data Availability", Korea Computer Congress 2016, Jun. 2016, pp. 1270-1272, Korea Information Science Society.

* cited by examiner

*Primary Examiner* — Wing F Chan
*Assistant Examiner* — Joseph R Maniwang
(74) *Attorney, Agent, or Firm* — Studebaker & Brackett PC

(57) ABSTRACT

A method for performing policy-based storage service federation can include: identifying whether or not a policy is applicable for a request received from a client by a request interceptor; obtaining a policy by evaluating request information relating to the request and a policy status; and obtaining a customized set of storage services based on the policy. The method can provide a framework corresponding to a storage federation layer to allow fast application development.

2 Claims, 9 Drawing Sheets

Fig. 3

| Service | Write Perf. | Read Perf. | Cost | Used Space | Availability |
|---|---|---|---|---|---|
| S1 | 0.530 | 0.570 | 0.011 | 0.022 | 0.992 |
| S2 | 0.833 | 0.466 | 0.010 | 0.037 | 0.025 |
| S3 | 0.313 | 0.370 | 0.010 | 0.054 | 1.511 |
| S4 | 0.211 | 0.348 | 0.007 | 0.090 | 0.007 |

Fig. 4

| Service | Write Perf. | Read Perf. | Cost | Used Space | Availability |
|---|---|---|---|---|---|
| S1 | 0.636 | 1.000 | 1.000 | 0.244 | 0.656 |
| S2 | 1.000 | 0.818 | 0.876 | 0.411 | 0.017 |
| S3 | 0.376 | 0.650 | 0.864 | 0.600 | 1.000 |
| S4 | 0.253 | 0.611 | 0.604 | 1.000 | 0.005 |

| Policy | Write Perf. | Read Perf. | Cost | Used Space | Availability |
|---|---|---|---|---|---|
| P1 | 2 | 3 | 4 | 5 | 1 |
| P2 | 4 | 2 | 3 | 5 | 1 |
| P3 | 5 | 4 | 2 | 1 | 3 |
| P4 | 3 | 4 | 1 | 2 | 5 |

Algorithm1: Policy-based Storage Service Selection

--- input : Storage services set $S$, Policies set $P$, Number of metrics $k$, Replication factor $r$
output : Selected storage services set if $size(S) \leq r$ then
    return $S$;
end
else
    $fw[k]$;
    for $j = 1 \rightarrow k$ do
        $fw[j] \leftarrow 0$;
        foreach $p_i \in P$ do
            /*   $j$-th metric weight by policy $p_i$ */
            $fw[j] \leftarrow fw[j] + p_i[j]$;
        end
    end
    foreach $s_i \in S$ do
        $dist \leftarrow 0$;
        for $j = 1 \rightarrow k$ do
            $s_i[j] \leftarrow s_i[j] * fw[j]$
            $dist \leftarrow dist + s_i[j] * s_i[j]$;
        end
        $s_i.d\ sqrt(dist)$;
    end
    $S \leftarrow orderByDistance(S)$;
    return $S[1:r]$;
end

POLICY-BASED STORAGE SERVICE FEDERATION METHOD AND APPARATUS

BACKGROUND

1. Technical Field

The present invention relates to a policy-based storage service federation method and apparatus. More particularly, the invention relates to a method and an apparatus for performing policy-based storage service federation by using a policy-based storage service federation framework.

2. Description of the Related Art

Whereas the IT industry is experiencing an explosion of data in terms of the variety and size of the data created, the speeds of processing such data remain relatively low, drawing attention to the need for methods of storing and managing data.

As regards the storing and managing of data, the generation of data on a massive scale has offered opportunities in the field of data analysis but at the same time has incurred problems of data maintenance, etc. Big data has a considerable size and is difficult to contain in a single storage location. Moreover, there is the problem that big datasets and data storage locations reduce data access performance. As such, there is a need for a system that can both provide expandability in step with the exponential growth of data generation speeds and determine the method and location of data storage in an automatic and accurate manner.

In relation to this, the Hewlett Packard Enterprise SPAR Peer Motion software offers a function for federating several third-party store server systems. However, a significant drawback here is that the federation function is not compatible with other systems.

Next, there has been various research conducted on methods of storage federation. However, most cases focus on federating cloud storage, in order to prevent vendor subordination and simplify the managing of several accounts. The problem with this approach is that the methods focus on only one service type (e.g. cloud storage).

Lastly, with regard to the selection of and access to services, current methods are limited in that only a fixed number of services are provided. Also, most methods of storage federation still lack functions for policy-based service selection.

SUMMARY OF THE INVENTION

An objective of the invention is to provide a framework corresponding to a storage federation layer for fast application development.

Also, an objective of the invention is to provide a policy-based storage service framework that is compatible with other systems and enables policy-based service selection.

To achieve the objectives above, an aspect of the invention provides a method of performing policy-based storage service federation that includes: having a request interceptor receive a request from a client and identifying whether or not a policy is applicable for the request. Also, the method of performing policy-based storage service federation may further include obtaining a policy by evaluating request information relating to the request and a policy status. Also, the method of performing policy-based storage service federation may further include obtaining a customized set of storage services based on the policy.

Another aspect of the invention provides an apparatus for performing policy-based storage service federation that includes a request interceptor configured to receive a request from a client, identify whether or not a policy is applicable for the request, obtain a policy based on an evaluation of request information relating to the request and a policy status, and obtain a customized set of storage services based on the policy. Also, the apparatus for performing policy-based storage service federation may further include a matching policy verifier configured to receive a policy request from the request interceptor, obtain active policies, and return a policy agreeing with the request information and the policy status to the request interceptor.

Still another aspect of the invention provides an apparatus for performing policy-based storage service federation that includes: a client configured to transmit a request for policy-based storage service federation; and a policy engine configured to receive the request from the client, identify whether or not a policy is applicable for the request, obtain a policy based on an evaluation of request information relating to the request and a policy status, and obtain a customized set of storage services based on the policy.

The policy-based federating of storage services according to an embodiment of the invention can improve data processing capacity and performance through horizontal and vertical scaling and parallel processing technology and can thereby provide a framework corresponding to a storage federation layer for fast application development.

Also, the policy-based federating of storage services according to an embodiment of the invention can provide a policy-based storage service framework that is compatible with other systems and enables policy-based service selection by utilizing policy-based storage services implemented by way of service profiles.

Additional aspects and advantages of the present invention will be set forth in part in the description which follows, and in part will be obvious from the description, or may be learned by practice of the invention.

BRIEF DESCRIPTION OF THE DRAWINGS

FIG. 3 illustrates storage service profiles used in an example based on an embodiment of the invention.

FIG. 4 illustrates storage service profiles after normalization as used in an example based on an embodiment of the invention.

FIG. 10 illustrates an algorithm for policy-based storage service selection in an example based on an embodiment of the invention.

DETAILED DESCRIPTION OF THE INVENTION

Figure 1:
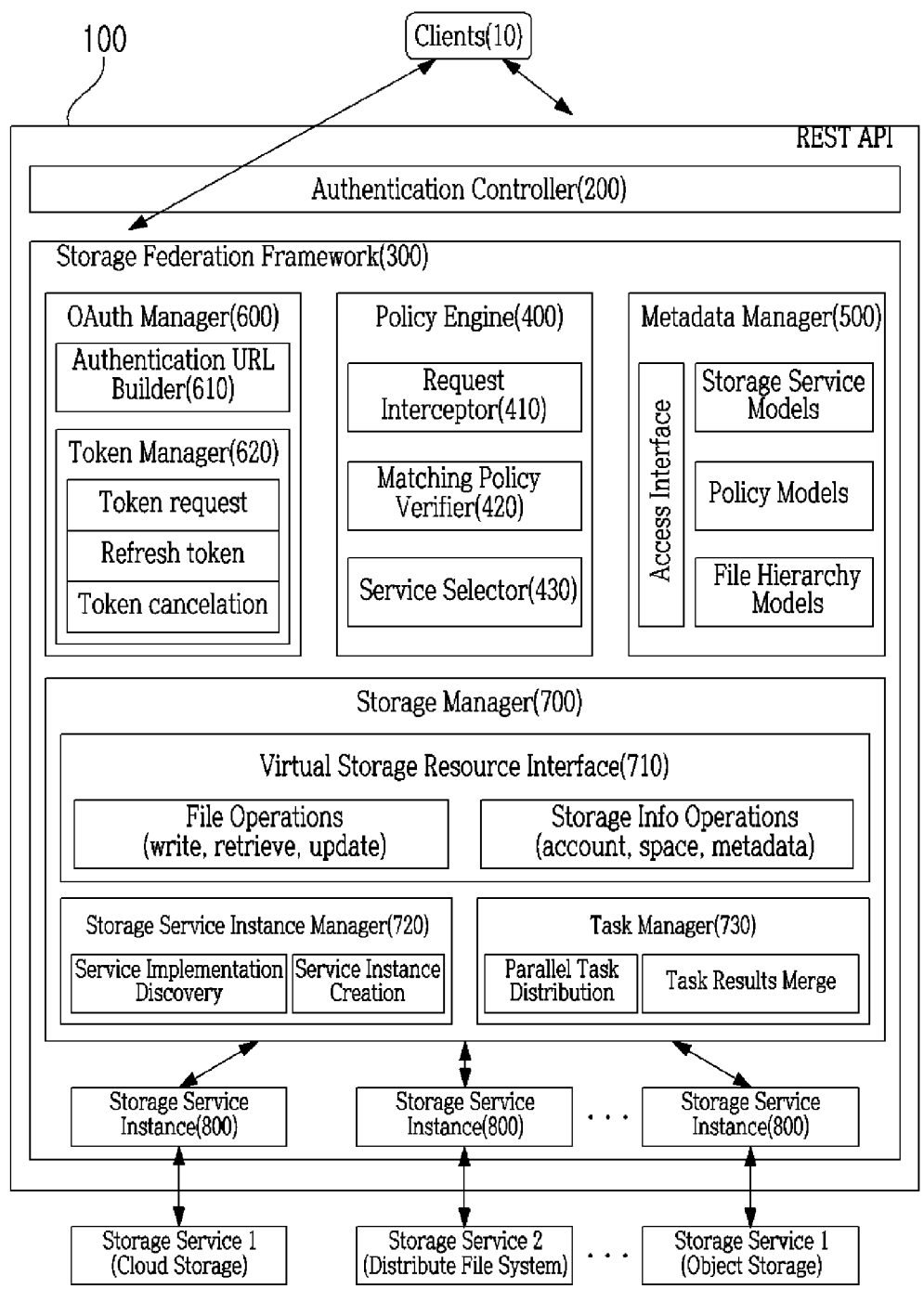
FIG. 1 illustrates the detailed composition of an apparatus for performing policy-based storage service federation according to an embodiment of the invention.

The features and advantageous effects of the present invention will be more clearly understood from the detailed descriptions provided below and the accompanying drawings, whereby the person having ordinary skill in the field of art to which the invention pertains would be able to readily practice the technical spirit of the present invention. As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. The terms used in the specification are intended merely to explain certain embodiments and are not intended to limit the invention in any way.

Below, a description is provided of an apparatus and a method for performing policy-based storage service federation according to an embodiment of the present invention. The purpose of the framework presented by an embodiment of the invention is to provide a storage federation layer for enabling fast development of applications. A major purpose of the framework is to provide a federation storage layer so as to allow a fast development of applications while supplying a sufficient amount of required resources. This can be operated on all file-based storage services with the implementation of a storage service interface. This allows the client to integrate desired services to the main framework instead of providing the client with a limited number of implemented services.

In relation to the above, FIG. 1 illustrates the detailed composition of an apparatus for performing policy-based storage service federation according to an embodiment of the invention. As illustrated in FIG. 1, an apparatus for performing storage service federation may include clients 10, a REST API 100, an authentication controller 200, and a storage federation framework 300. Also, the storage federation framework 300 may include a policy engine 400, a metadata manager 500, an authentication manager (OAuth manager) 600, a storage manager 700, and storage service interfaces 800.

The client 10 may send a request for policy-based storage service federation via the REST API 100 to the storage federation framework 300. Here, the request can be provided to the storage federation framework 300 by way of the authentication controller 200.

The REST API 100 may receive the request for the storage service federation from the client 10 and may perform the storage service federation by way of the framework 300. That is, the REST API 100 may serve to convert the framework into an independent service solution. This can also be expanded to the architecture and domain models.

The authentication controller 200 component may be integrated to provide a token-based authentication procedure. This additional element may provide an authentication token for client registration, authentication, and API end point access. The domain model may be expanded to allow the clients themselves to define their service authentication, policies, and related files.

The policy engine 400 may receive the request from the client 10 and identify whether or not there are policies applicable to the request. Also, the policy engine 400 may evaluate the request information concerning the request and the policy status to obtain a policy and may obtain a customized set of storage services based on the policy.

More specifically, the policy engine 400 may act as the brain of the framework 300. The policy engine 400 may handle operations related to decision making, service selection, verification requests, and complementing requests. For automated decisions, a policy-based data distribution algorithm may be implemented. Two policy models may be implemented. The first model may define the importance of measured items in a service profile, while the second model may define the number of replicates under the given conditions. This model may permit a client to individually define the number of data replications. The policy engine 400 may include a request interceptor 410, a matching policy verifier 420, and a service selector 430.

The request interceptor 410 may receive a request from the client 10, identify whether or not there are policies applicable to the request, evaluate the request information concerning the request and the policy status to obtain a policy, and obtain a customized set of storage services based on the policy.

Also, the request interceptor 410 may request service credentials for the set of storage services, authenticate the service credentials, and add the service information and authorization to the request.

That is, the verification and complementation of each request may be performed before transmission to the storage manager 700. In complementing the request, the service credentials must be included. Therefore, all requests may have to receive verification by the request interceptor 410.

The matching policy verifier 420 may receive a policy request from the request interceptor 410, obtain active policies, and return policies that match the request information and policy status to the request interceptor 410. That is, the matching policy verifier 420 may serve to check whether or not the current file matches all of the policy conditions.

The service selector 430 may obtain service profiles based on the policies and may generate a customized set of storage services based on the service profiles. That is, the service selector 430 may serve to select the best service groups according to the policies and replication factor.

The metadata manager 500 may obtain the active policies according to the policy request and may transmit the active policies to the matching policy verifier 420. More specifically, the metadata manager 500 may serve to define the layer domain models of the storage services, policies, and files. The metadata manager 500 may also provide an interface that allows the searching and creating of other elements as well as modifying the information of models. The metadata manager 500 can use the code-first access approach of the Microsoft Entity Framework. This is a domain-based design tool that focuses on generating domain classes rather than designing a certain database. By using the Entity Framework, it is possible to easily expand a domain model by creating a new domain class or overwriting an existing one.

The authentication manager 600 may receive the request for the service credentials from the request interceptor 410 and may provide a token for the authentication to the request interceptor 410. More specifically, the authentication manager 600 may be implemented to be capable of using OAuth 2.0. The authentication manager 600 can deal with cloud storage and can include two subcomponents. That is, the authentication manager 600 can include an authentication URL builder 610 and a token manager 620.

The authentication URL builder 610 may serve to compose an authentication URL and a redirect URL based on the profiles of the given services. Also, the authentication URL builder 610 may check that the composed URL is valid. The token manager 620 may serve to request and renew the token and to cancel a service access token.

The storage manager 700 may receive the request, to which the service information and the authorization have been added, from the policy engine 400. Also, the storage manager 700 may discover service implementation classes for each service based on the received service information and may create service implementation class instances based on the discovered service implementation class.

The storage manager 700 may, based on the request, the service privileges associated with the authorization, and the service implementation class instances, process tasks for a multiple number of services that the task manager 730 accesses asynchronously. Also, the storage manager 700 may merge the responses of the services and transmit the merged responses to the client 10.

That is, the storage manager 700 may be a component that manages the resources of the central storage. The storage manager 700 may provide an interface that enables access to the resources of a multiple number of storage services from a single point. Also, the storage manager 700 can be implemented with parallel processing technology so as to improve execution time and enable simultaneous access to multiple services. The storage manager 700 may use reflection-oriented programming to dynamically generate implementation classes and provide access services. The storage manager 700 may be divided into three subcomponents as described below.

That is, the storage manager 700 may include a virtual storage resource interface 710, an instance manager (storage service instance manager) 720, and a task manager 730.

The virtual storage resource interface 710 may receive the request, to which the service information and the authorization have been added, from the request interceptor 410. That is, the virtual storage resource interface 710 may convert all of the individual storage media in the storage medium with which services are being provided adequately, to provide a single access point.

The instance manager 720 may discover service implementation classes for the respective services based on the service information received from the virtual storage resource interface 710 and may generate service implementation class instances based on the discovered service implementation classes. Also, the instance manager 720 may transmit the service implementation class instances to the virtual storage resource interface 710. That is, the instance manager 720 may serve to find service implementation classes and create instances. The instance manager 720 may find the classes implemented for the services according to unique names defined in the service domain model and the storage service interface inheritance by way of reflection-oriented programming.

The task manager 730 may receive the request, the service privileges associated with the authorization, and the service implementation class instances from the virtual storage resource interface 710. Also, the task manager 730 may process tasks for the multiple services accessed asynchronously, merge the responses of the services, and transmit the responses to the virtual storage resource interface 710. Here, the virtual storage resource interface 710 may generate a final response intended for the client 10 based on the responses received from the task manager 730. That is, the task manager 730 may manage the multiple services accessing in a parallel manner as well as the responses thereto.

The storage service interface 800 may transmit the responses from the instance manager 720 and the task manager 730 to multiple storage devices 800 performing multiple storage services. Here, the multiple number of storage devices 800 can include devices related to cloud storage, distributed file systems, and object storage, as illustrated in the drawing. That is, the storage service interface 800 may be implemented such that each storage service is able to access the present framework. Also, the interface may be implemented to allow dynamic discovery and allow the use of instances of service classes by way of reflection-oriented programming.

A description is provided above of an apparatus for performing policy-based storage service federation. Below, there follows a description of a method of performing policy-based storage service federation. Related to this is FIG. 2, which is a flowchart illustrating a method of performing policy-based storage service federation according to an embodiment of the invention.

Figure 2:
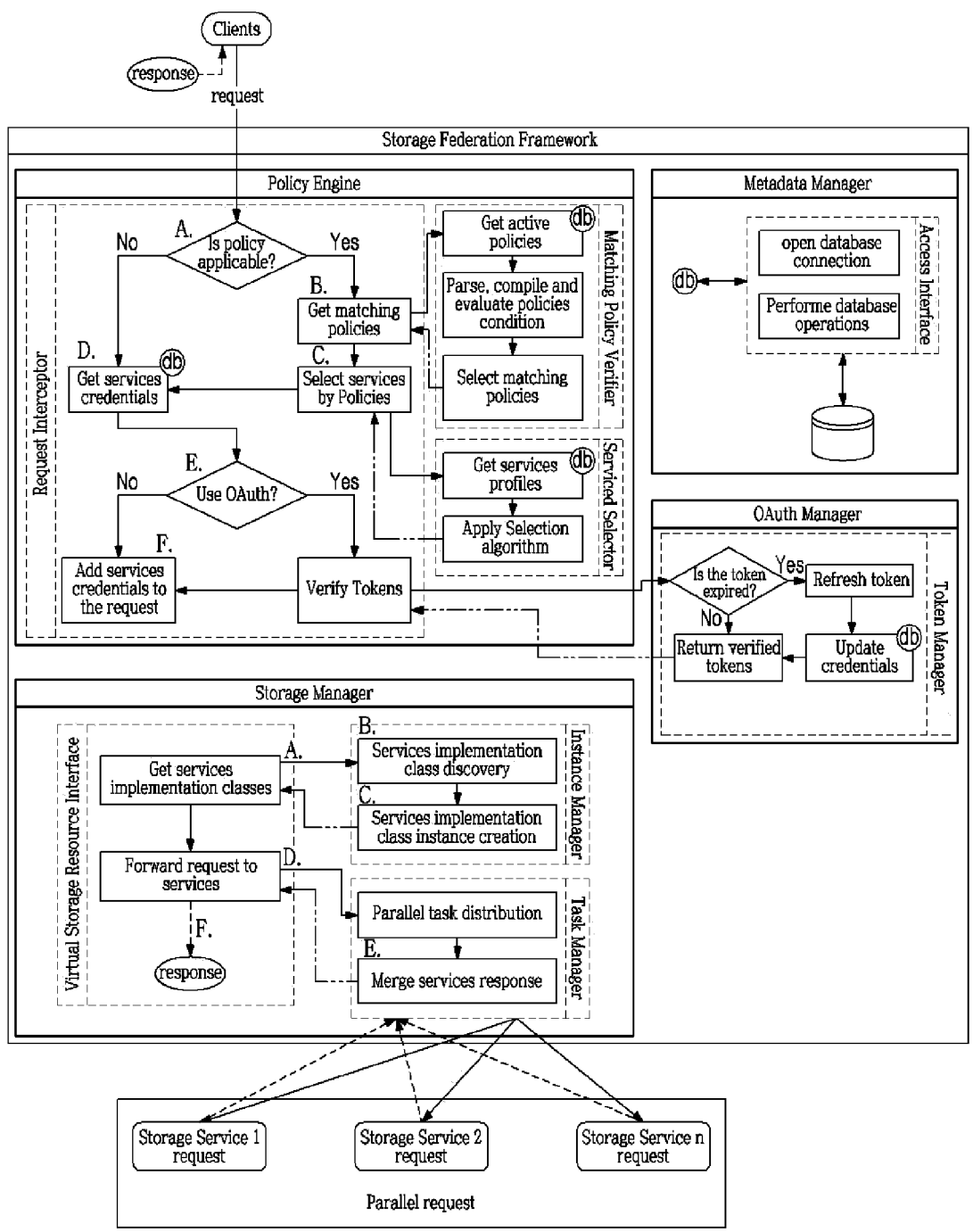
FIG. 2 is a flowchart illustrating a method of performing policy-based storage service federation according to an embodiment of the invention.

As illustrated in FIG. 2, a method of performing policy-based storage service federation may include (i) procedures for federating services performed by a policy engine and (ii) procedures for federating services performed by a storage manager.

(i) Policy Engine Identifies and Complements Request.

A. Identifying Policy Applicability: A request from a client is received by the request interceptor, and the possibility of applying a policy to the request is identified. That is, the request interceptor identifies whether or not there are policies applicable to the request. If there is an applicable policy, for example when creating a file or searching a replicated file, then the process may proceed to step B. Conversely, if there is no policy applicable, then the request may be transmitted to all services or specified services. For example, when reading an unreplicated file or when a usable space has been provided, then the process may proceed to step D.

B. Obtaining Policies: Policies may be obtained based on an evaluation of the request information concerning the request and the policy status. That is, the connections to the policies may be achieved by the matching policy verifier. This can entail receiving active policies from the metadata manager, evaluating the compile and request information and the policy status, and returning any matching policies.

C. Obtaining Storage Service Set: A customized set of storage services may be obtained based on the policies above. That is, the customized set of storage services based on the policies may be obtained by way of the service selector. This can entail receiving storage service profiles from the metadata manager. Afterwards, a policy-based algorithm may be applied to find the service most suitable for the requested procedure.

In relation to the above, a storage service profile for each service can be defined by metrics corresponding to availability, writing performance, reading performance, cost, and used space. Also, the policies can be classified into P1 to P4. Here, P1 may correspond to cases that focus mainly on modifications and reading/writing operations, and P2 may correspond to cases that focus mainly on reading operations with very little writing operations. Also, P3 may correspond to cases with very little writing and reading operations, while P4 may correspond to data having low importance that has a low probability of being used but is retained merely for keeping.

The service profiles may include S1 to S4, where normalized weights may be applied for each service profile, each of S1 to S4. The order of priority of the metrics may be determined for each of P1 to P4, and based on the normalized weights and the order of priority, the selection order of S1 to S4 may be determined for each of P1 to P4. This will be described later on in further detail.

D. Requesting Service Credentials: The service credentials may be requested for the set of storage services. That is, the request interceptor may request service credentials from the metadata manager. Here, if the corresponding services use the OAuth protocol, then the process may proceed to step E.

E. Performing Authentication: Authentication of the service credentials may be performed. That is, the authentication by OAuth may be performed by the authentication manager (OAuth manager). If the token expires during a refresh, then the authorization may be renewed, and a new token may be issued to the request interceptor.

F. Transmitting Request: The service information and the authorization may be added to the request, after which the request may be transmitted to the storage manager. That is, the service information and the authorization may be added to the request of the client and sent to the storage manager.

(ii) Storage Manager Transfers Request to Matching Storage Service. Also, the Storage Manager Generates a Response for the Client.

A. Transmitting Service Information: The virtual storage resource interface may transmit the service information to the storage service instance manager.

B. Discovering Service Implementation Classes: The service implementation classes for the respective services may be discovered based on the service information. That is, the storage service instance manager may use reflection-oriented programming when finding the implementation classes of the services according to unique names defined in the storage service information and storage service interface inheritance.

C. Generating/Transmitting Service Implementation Class Instances: Service implementation class instances may be generated based on the discovered service implementation classes, and the service implementation class instances may be transmitted to the virtual storage resource interface. That is, the respectively implemented service class instances may be generated and sent to the virtual storage resource interface.

D. Transmitting Request, Service Privileges, and Service Implementation Class Instances: The request of the client, service privileges, and instances of the service classes may be sent to the task manager.

E. Processing Tasks and Merging Responses: Based on the responses received by the virtual storage resource interface from the task manager, a final response may be generated that is to be received by the client. That is, the task manager may use parallel processing technology to process all of the services accessed asynchronously. Afterwards, the responses of all services may be merged and transmitted to the virtual storage resource interface.

F. Generating Final Response: The virtual storage resource interface may transmit the final response in reply to the request from the client.

The method and apparatus for performing policy-based storage service federation described above have the following unique features.

(a) The present framework presents possibilities for a service that provides an integrated form of multiple file-based heterogeneous storage media. For example, the data from different storage types, such as cloud storage, distributed file systems, object storage, and ftp, can be managed through a single control point in a virtual storage medium.

i. Parallel processing is possible, and data processing capacity and performance can be improved.

ii. horizontal and vertical scaling iii. automated decisions (b) The policy-based algorithm defines the numbers of storage regions to satisfy clients' requirements as accurately as possible.

(c) The simple policy model based on storage service metrics (such as availability, cost, space, and performance, for example) enables clients to freely define data distribution rules.

The method and apparatus for performing policy-based storage service federation described above can be applied in the following fields.

FIELDS OF APPLICATION (1) Big Data Storage
(2) Cloud Federation
(3) Storage as a Service (SaaS)
(4) Parallel Data Processing
(5) Enterprise Storage Solutions Also, the method and apparatus for performing policy-based storage service federation described above are expected to provide the following effects.

(1) Policy-Based Storage Service Selection i. Storage Service Profiles Defined: Four types of service profiles may be defined as S1, S2, S3, and S4, with five types of storage metrics defined when each piece of information is created. For all of the metrics, a lower value may represent better service. Based on the above, the metrics may be redefined.

Figure 5B:
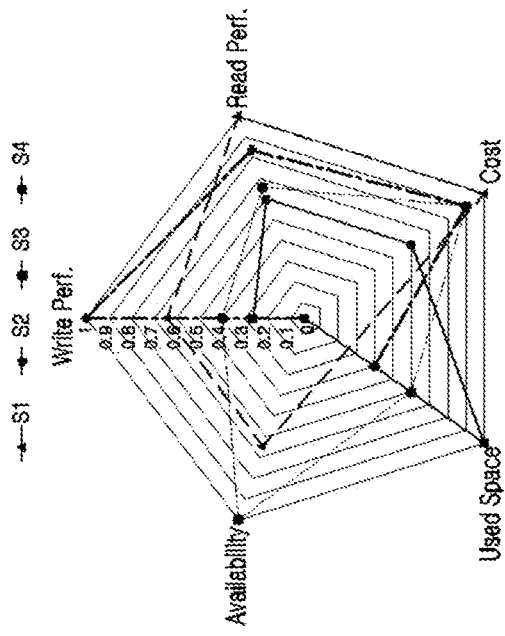
FIG. 5A and FIG. 5B illustrate service profiles that have been normalized according to an embodiment of the invention in comparison with service profiles that have not been normalized.
Figure 5A:
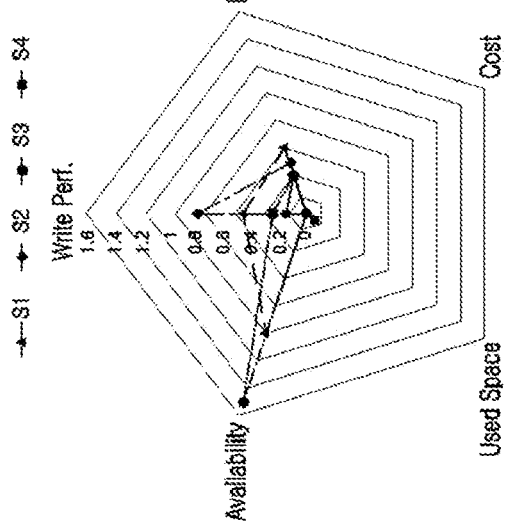

A. Availability: from the overall usage time during which a service was provided, the proportion of the time during which the service was not provided in a normal manner, represented as a percentage value B. Writing and Reading Performance: the average time spent in processing 1 MB of data C. Cost: cost of using 1 GB of storage D. Used Space: proportion of space currently being used In relation to the above, FIG. 3 illustrates storage service profiles used in an example based on an embodiment of the invention. Also, FIG. 4 illustrates normalized storage service profiles used in an example based on an embodiment of the invention, and FIGS. 5A and 5B illustrate service profiles that have been normalized according to an embodiment of the invention in comparison with service profiles that have not been normalized.

As illustrated in FIG. 3, the service profiles S1 to S4 may have different weights applied for writing performance, reading performance, cost, used space, and availability.

ii. Storage Service Profiles Normalized: As illustrated in FIG. 4, the service profiles may have to be normalized for a fair determination of the contribution of each metric during the selection process. In FIGS. 5A and 5B, it is easier to determine how the metrics of writing performance, reading performance, cost, used space, and availability are trending with the service profiles that have been normalized, compared to the service profiles that have not been normalized.

As described above, an aspect of the present invention is to enable the distribution and replication of data over multiple storage services based on dynamic and personalized policies. Each storage service may be defined with a group of multiple metrics. A policy may specify the importance of each measured item for storing specific data. Lastly, many replications may be provided. A storage service may have a finite number of defined metrics. There exist an exorbitant amount of other metrics that can be used for maximizing the efficiency of data storage. In spite of this, however, such metrics may merely cause confusion, as such metrics not only cover different ranges but also in some cases convey opposite meanings with the same values. For example, whereas a high value for availability represents a better performance, a low value for cost is more desirable. As such, the user would prefer as high a value as possible for availability, but conversely would prefer as low a value as possible for cost. Because of this, a normalization operation may be needed, which is to express all of the values as values within a range of 0 to 1, so as to allow an objective comparison. In the present specification, it is arbitrarily supposed that for all values, a lower value represents better service. For example, availability may be defined using the percentage of the period during which service was not provided properly. Thus, a lower value may represent better availability.

An embodiment of the present invention may have a set of policies for finding the most suitable group of storage services. Each policy may be defined with two properties. Firstly, the conditions should correspond to the policy together with the data. Secondly, the weights on the measured items of each service may be applied according to an order of priority. This may mean that the first order has the highest weight.

iii. Policies Defined: Four policies may be defined with the following conditions.

A. P1, representing the case where mostly modifications and reading/writing operations are performed. In this case, availability may be given the highest priority. An example of such a case may include a word processing operation.

B. P2, representing the case that focuses solely on reading operations with very little writing operations. Consequently, the most important metrics may be reading performance and availability. An example of such a case may include viewing a media file or PDF document.

C. P3, representing the case where very little writing and reading operations are performed. An example may include data generated as backup. Thus, the most important properties here may be available storage space and cost.

Figure 8:
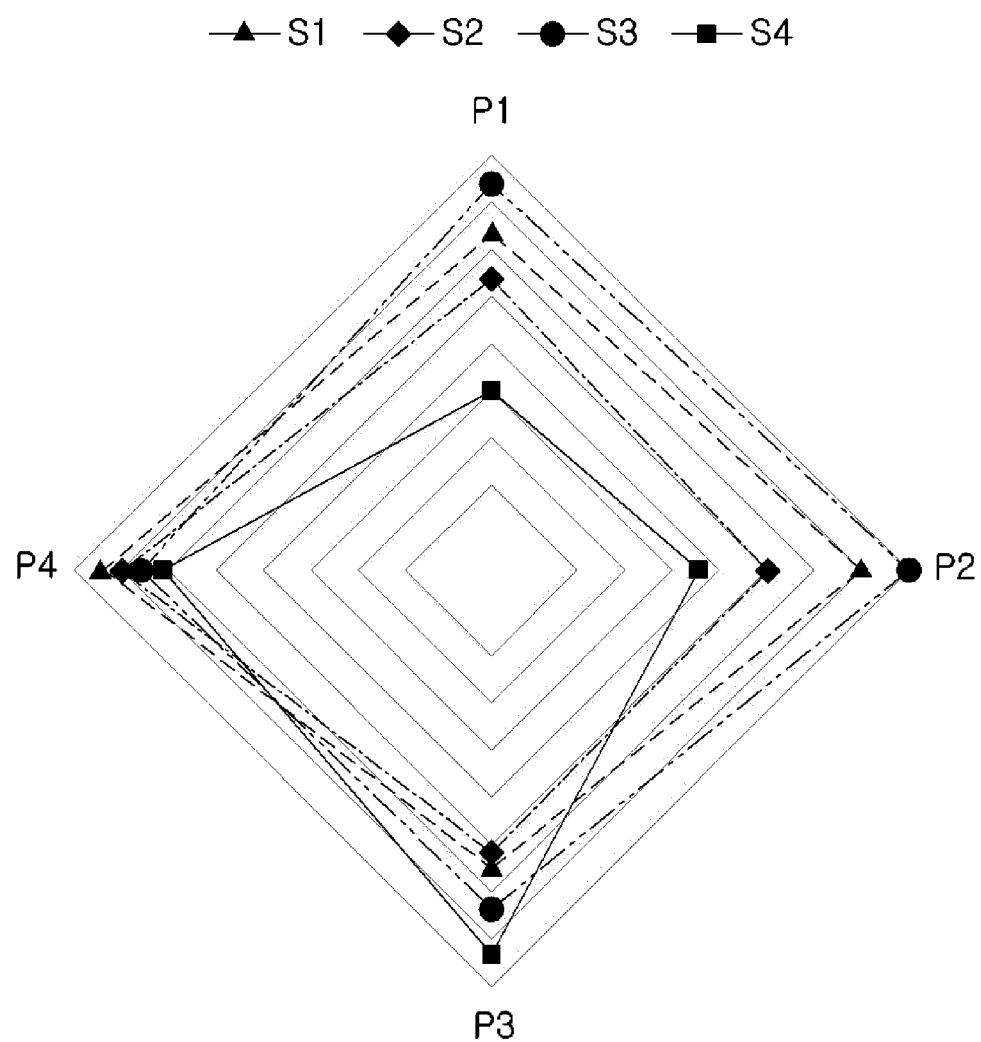
FIG. 8 shows a radial graph representing policy-based service distances in an example based on an embodiment of the invention.

D. P4, representing data of low importance. This represents cases where the data is very unlikely to be used but is used merely for keeping. In this case, cost may be the most important metric.

iv. Storage Service Selection: Finally, a policy-based selection algorithm defined to identify the best selection order may be applied. The algorithm is shown in FIG. 8.

A. Storage service selection order for P1 and P2: [S4, S2, S1, S3].

B. Storage service selection order for P3: [S2, S1, S3, S4].

C. Storage service selection order for P4: [S4, S3, S2, S1].

Next, consider the mathematical definitions for performing the policy-based storage service federation as described above.

Let the set of storage services be defined as $S=\{s1, s2, \ldots, sn\}$, the set of policies be defined as $P=\{p1, p2, \ldots, pm\}$, and the replication factor be defined as $r$. We want to select the subset R having a size from r to S that minimizes the distance between P and R.

i. Storage Service Model

Each storage service can be defined as a vector.

$$K_{s_i} = \{\phi_1^i, \phi_2^i, \ldots, \phi_k^i\}$$

The J-th metric for service i may be expressed as below:

$$\phi_j^i, \phi_j^i \in [0,1]$$

ii. Policy Model

Each policy can be defined as a vector.

$$K_{P_i} = \{\varphi_1^i, \varphi_2^i, \ldots, \varphi_k^i\}$$

The importance of the J-th metric based on policy i may be expressed as below:

$$\varphi_j^i, \varphi_j^i \in \{1,2, \ldots, k\}$$

iii. Metrics Weight

The weights of the metrics may be distributed exponentially according to the order of importance. The statistical weight j based on policy i may be expressed as below:

$$f_W(p_i, j) = e^{-\lambda \cdot \varphi_j^i}$$

The statistical weights for all policies P may be expressed as below:

$$f_W(P, j) = \sum_{i=1}^{m} f_W(p_i, j)$$

To resolve the problem of service selection, we used a k-nearest neighbors algorithm. Generally, k-NN is used to classify query points according to nearby neighbors. To apply this algorithm to this problem, query point Q may be at the center of the space that maximizes the metrics of all storage dimensions, and k (the number of neighbors) may be determined by r (the replication factor). Euclidean distances may be used in measuring distances. A weight for the policy is applied to each property.

$$D(s_i) = \sqrt{\sum_{j=1}^{k} (\phi_j^i \times f_W(P, j))^2}$$

Figures 6, 7:
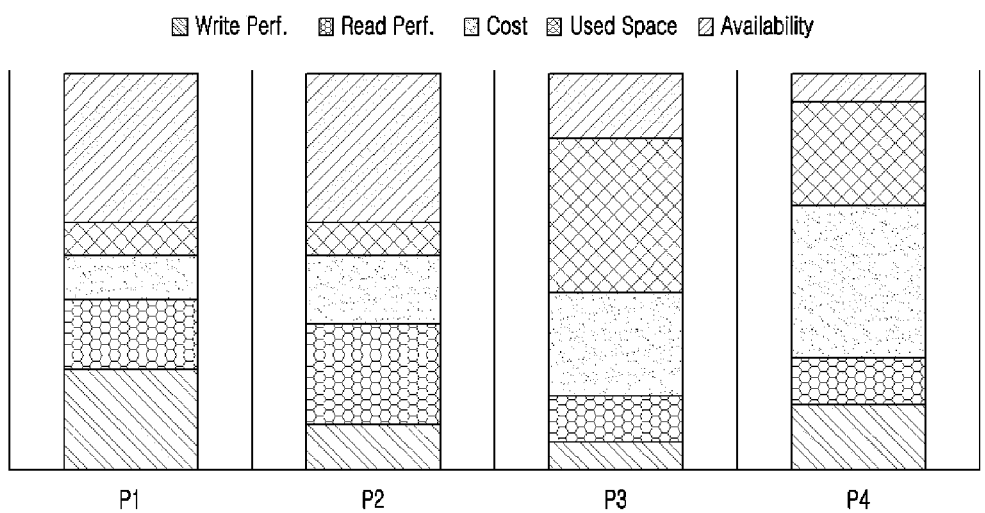
FIG. 6 illustrates priority orders of metrics defined for policies in an example based on an embodiment of the invention.
FIG. 7 shows bar graphs representing the degrees of importance of the metrics in each policy in an example based on an embodiment of the invention.

In relation to the above, FIG. 6 illustrates priority orders of metrics defined for policies in an example based on an embodiment of the invention. Also, FIG. 7 shows bar graphs representing the degrees of importance of the metrics in each policy in an example based on an embodiment of the invention, and FIG. 8 shows a radial graph representing policy-based service distances in an example based on an embodiment of the invention.

Referring to FIG. 6, it can be seen that availability is the most important for P1 and P2, used space is the most important for P3, and cost is the most important for P4.

FIG. 7 summarizes to what degrees of importance the writing performance, reading performance, cost, used space, and availability are regarded in P1 to P4.

(2) Parallel Processing Performance

Figure 9A:
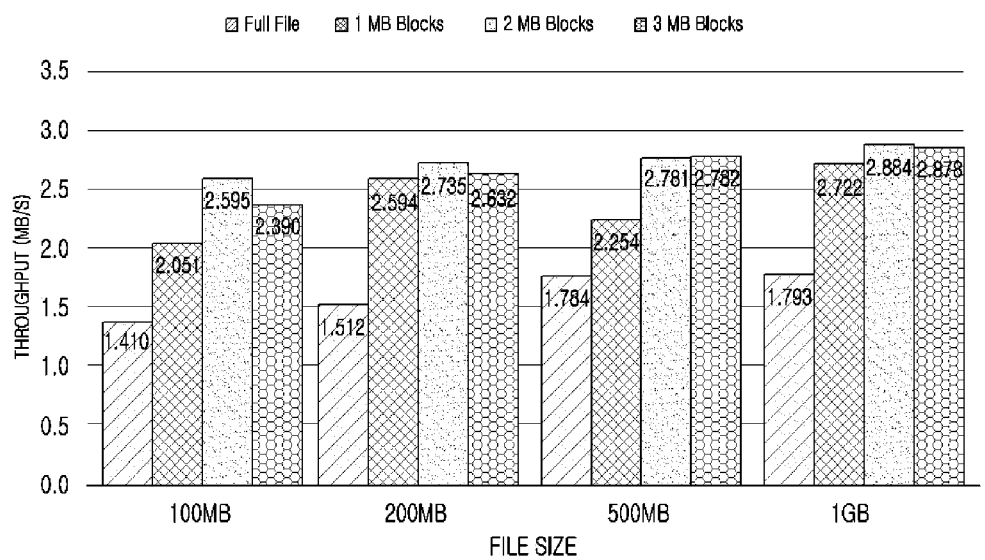
FIG. 9A, FIG. 9B, and FIG. 9C illustrate the throughput achieved for different file sizes and block sizes when performing the tasks of writing, reading, and deleting in an example based on an embodiment of the invention.
Figure 9B:
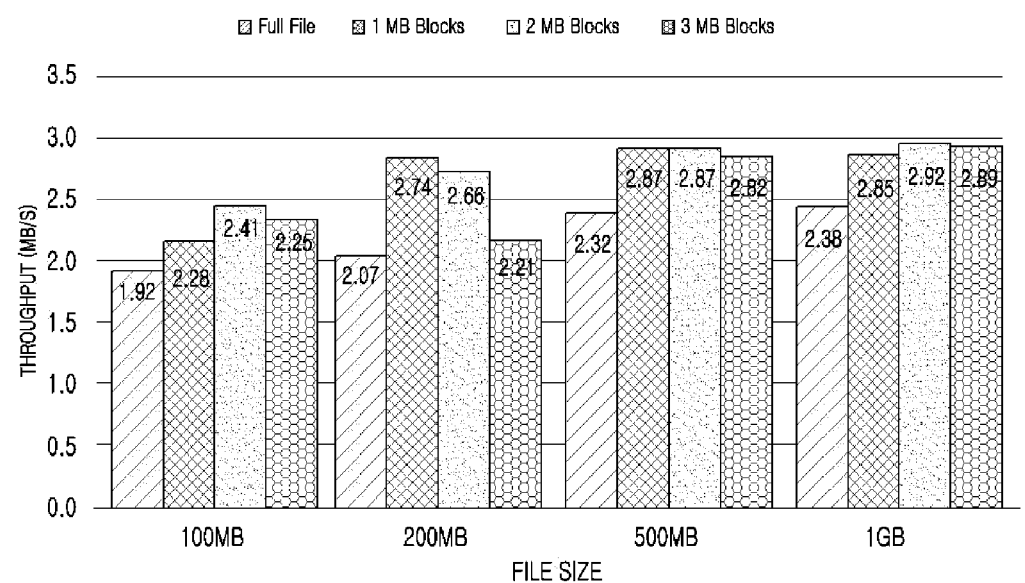
Figure 9C:
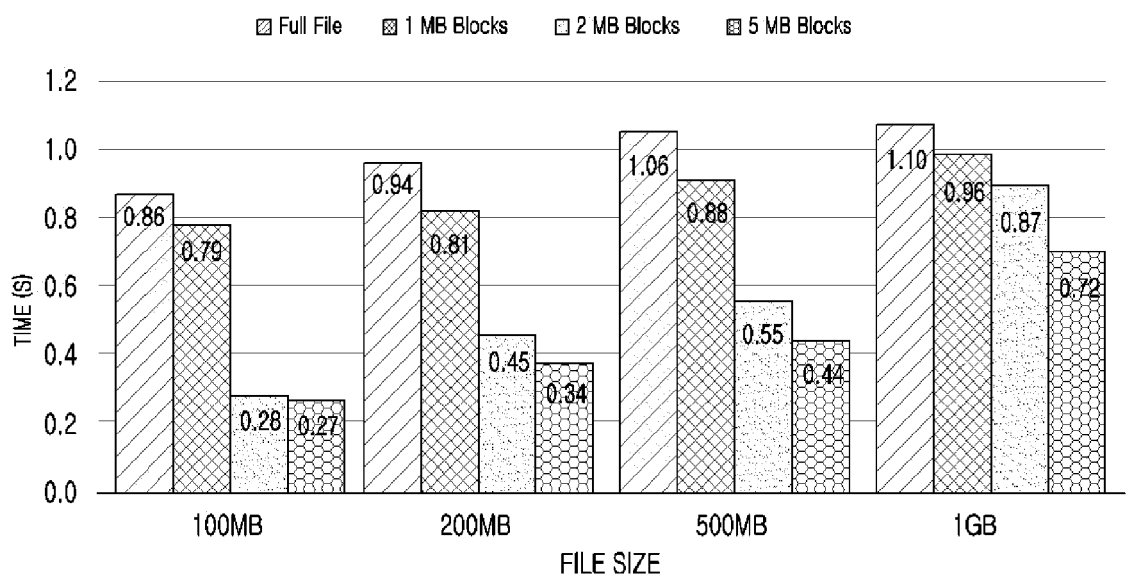

To evaluate the performance of the parallel processing of striped files and non-striped files in the framework, we used various striped files of different block sizes and file sizes. Related to this are FIGS. 9A to 9C, which illustrate the throughput achieved for different file sizes and block sizes when performing the tasks of writing, reading, and deleting in an example based on an embodiment of the invention. In the examples of FIGS. 9A to 9C, reading, writing, and deleting operations were performed and evaluated. The results show that the method of combining striping and parallel processing can improve performance and data throughput.

A description is provided above of a policy-based service federation framework a method and an apparatus for performing policy-based storage service federation using the framework. An apparatus for performing federation to which the framework may be installed can be a terminal or user device, where such terminal or user device can be used to connect to multiple storage service devices (such as those involving cloud storage, a distributed file system, and object storage).

Also, an apparatus for performing federation to which the framework may be installed can be a gateway, where such a gateway can be used to connect to multiple storage service devices (such as those involving cloud storage, a distributed file system, and object storage).

FIG. 10 illustrates an algorithm for policy-based storage service selection in an example based on an embodiment of the invention. As illustrated in FIG. 10, the storage service set may be defined as S, the number of metrics may be defined as k, and the replication factor may be defined as r. That is, as described above, the set of storage services may be defined as S={s1, s2, . . . , sn}, the set of policies may be defined as P={p1, p2, . . . , pm}, and the replication factor may be defined as r. We want to select the subset R having a size of r to S that minimizes the distance between P and R.

The framework described above can provide a federation layer component to allow easier development of applications. It is also possible to provide an independent service based on the REST API implemented above.

At least one embodiment of the present invention can improve data processing capacity and performance through horizontal and vertical scaling and parallel processing technology and can thus provide a framework corresponding to a storage federation layer for fast application development.

Also, at least one embodiment of the present invention can provide a policy-based storage service framework that is compatible with other systems and enables policy-based service selection by utilizing policy-based storage services implemented by way of service profiles.

While the spirit of the invention has been described in detail with reference to particular embodiments, the embodiments are for illustrative purposes only and do not limit the invention. It is to be appreciated that those skilled in the art can change or modify the embodiments without departing from the scope and spirit of the invention.

What is claimed is:

1. A method of performing policy-based storage service federation, the method comprising:
   identifying whether or not a policy is applicable for a request received from a client by a request interceptor;
   obtaining the policy by evaluating request information relating to the request and a policy status;
   obtaining a customized set of storage services based on the policy;
   requesting a service credential for the set of storage services;
   authenticating the service credential;
   adding service information and authorization to the request and transmitting the request to a storage manager;
   transmitting the service information to an instance manager, the transmitting performed by a virtual storage resource interface;
   discovering a service implementation class for each service based on the service information;
   creating a service implementation class instance based on the discovered service implementation class and transmitting the service implementation class instance to the virtual storage resource interface; and
   transmitting the request, a service privilege associated with the authorization, and the service implementation class instance to a task manager, the transmitting performed by the virtual storage resource interface.

2. The method of performing policy-based storage service federation according to claim 1, further comprising:
   processing tasks for a plurality of asynchronously accessed services and merging responses of the services, the processing and merging performed by the task manager; and
   generating a final response for the client based on a response received from the task manager, the generating of the final response performed by the virtual storage resource interface.

* * * * *